(12) United States Patent
Morrow et al.

(10) Patent No.: US 8,295,319 B2
(45) Date of Patent: Oct. 23, 2012

(54) CERAMIC GAS LASER HAVING AN INTEGRATED BEAM SHAPING WAVEGUIDE

(75) Inventors: Clifford E. Morrow, North Kingstown, RI (US); Wendelin Weingartner, Brooklyn, NY (US)

(73) Assignee: Iradion Laser, Inc., North Smithfield, RI (US)

( * ) Notice: Subject to any disclaimer, the term of this patent is extended or adjusted under 35 U.S.C. 154(b) by 66 days.

(21) Appl. No.: 12/952,289

(22) Filed: Nov. 23, 2010

(65) Prior Publication Data

US 2012/0128022 A1 May 24, 2012

(51) Int. Cl.
*H01S 3/03* (2006.01)
(52) U.S. Cl. .............................. 372/64; 372/61; 372/55
(58) Field of Classification Search ............ 372/64, 372/61, 55
See application file for complete search history.

(56) References Cited

U.S. PATENT DOCUMENTS

| | | |
|---|---|---|
| 3,950,712 A | 4/1976 | Chenausky et al. |
| 4,169,251 A | 9/1979 | Laakman |
| 4,373,202 A | 2/1983 | Laakmann et al. |
| 4,393,506 A | 7/1983 | Laakmann et al. |
| 4,455,658 A | 6/1984 | Sutter |
| 4,493,087 A | 1/1985 | Laakmann et al. |
| 4,596,018 A | 6/1986 | Gruber et al. |
| 4,719,639 A | 1/1988 | Tulip |
| 4,720,691 A | 1/1988 | Rammos |
| 4,805,182 A | 2/1989 | Laakmann |
| 4,837,772 A | 6/1989 | Laakmann |
| 4,939,738 A | 7/1990 | Opower |
| 5,008,894 A | 4/1991 | Laakmann |
| 5,048,048 A | 9/1991 | Nishimae et al. |
| 5,065,405 A | 11/1991 | Laakmann et al. |
| 5,155,739 A | 10/1992 | Mefferd |
| 5,216,689 A | 6/1993 | Gardner et al. |
| 5,220,577 A | 6/1993 | Opower |
| 5,386,431 A | 1/1995 | Tulip |
| 5,409,314 A | 4/1995 | Laakmann |
| 5,592,504 A | 1/1997 | Cameron |
| 5,602,865 A | 2/1997 | Laakmann |
| 5,646,765 A | 7/1997 | Laakmann et al. |
| 5,661,746 A | 8/1997 | Sukhman et al. |
| 5,754,575 A | 5/1998 | Sukhman et al. |
| 5,805,754 A | 9/1998 | Zhang |
| 5,822,354 A | 10/1998 | Vitruk |

(Continued)

OTHER PUBLICATIONS

International Searching Authority, International Search Report & Written Opinion for PCT/US2011/059540, Feb. 14, 2012, pp. 1-8.

(Continued)

*Primary Examiner* — Kinam Park
(74) *Attorney, Agent, or Firm* — Barnes & Thornburg LLP

(57) ABSTRACT

A laser may comprise a ceramic body defining a chamber therein containing a laser gas. The ceramic body may include a plurality of parallel walls that partially define a first section of the chamber, the first section of the chamber defining a waveguide. The ceramic body may further include a plurality of oblique walls that partially define a second section of the chamber, the second section of the chamber being shaped to modify a transverse profile of a laser beam traveling through the second section of the chamber. The laser may further comprise a plurality of electrodes positioned outside the ceramic body and adjacent to the plurality of parallel walls such that only laser gas within the first section of the chamber is excited when an excitation signal is applied to the plurality of electrodes.

22 Claims, 4 Drawing Sheets

U.S. PATENT DOCUMENTS

| | | | |
|---|---|---|---|
| 5,881,087 A * | 3/1999 | Sukhman et al. | 372/61 |
| 5,892,782 A | 4/1999 | Vitruk et al. | |
| 5,953,360 A | 9/1999 | Vitruk et al. | |
| 6,195,379 B1 | 2/2001 | Jones et al. | |
| 6,198,758 B1 | 3/2001 | Broderick et al. | |
| 6,198,759 B1 | 3/2001 | Broderick et al. | |
| 6,599,034 B2 | 7/2003 | Tatoh et al. | |
| 6,603,794 B2 | 8/2003 | Bethel et al. | |
| 6,614,826 B1 * | 9/2003 | Bethel et al. | 372/64 |
| 6,856,639 B2 * | 2/2005 | Dutov et al. | 372/61 |
| 7,460,577 B2 | 12/2008 | Morrow | |
| 7,480,323 B2 | 1/2009 | Murray | |
| 7,570,683 B1 | 8/2009 | Broderick et al. | |
| 2005/0057640 A1 | 3/2005 | Clarke et al. | |
| 2005/0105581 A1 | 5/2005 | Seguin et al. | |
| 2005/0175054 A1 | 8/2005 | Shackleton et al. | |
| 2006/0029116 A1 * | 2/2006 | Shackleton et al. | 372/55 |
| 2007/0041418 A1 | 2/2007 | Laughman et al. | |
| 2008/0101430 A1 | 5/2008 | Morrow | |
| 2008/0123707 A1 | 5/2008 | Murray | |
| 2008/0124433 A1 | 5/2008 | Yelden et al. | |
| 2008/0285607 A1 | 11/2008 | Murray | |
| 2008/0285613 A1 | 11/2008 | Murray | |

OTHER PUBLICATIONS

Synrad, Inc., Firestar V-Series CO2 Lasers Overview, 1 page, www.synrad.com/vseries/index.htm.

Synrad, Inc., Firestar V-Series 30 & 40W CO2 Lasers, 4 pages.

Synrad, Inc., 30 Watt CO2 Laser with Its Compact Size, Near-Perfect Beam Quality and Fast Rise Times, the Synrad v30 CO2 Laser Provides Users with the Ultimate Low Power CO2 Laser Tool, 1 page, www.synrad.com/vseries/v30.htm.

Synrad, Inc., Firestar OEM v30 Reference Guide, Version 3.2, Jun. 2012, 36 pages.

Synrad, Inc., Synrad's Firestar v40, 2 pages, www.synrad.com/vseries/v40.htm.

Synrad, Inc., Firestar v40 Version D Operator's Manual, Version 3.1, Sep. 2010, 106 pages.

* cited by examiner

CERAMIC GAS LASER HAVING AN INTEGRATED BEAM SHAPING WAVEGUIDE

FIELD OF THE INVENTION

The present invention relates generally to lasers and, more specifically, to ceramic slab gas lasers having integrated beam shaping waveguides.

BACKGROUND

In waveguide resonators, the resonator walls influence the propagation of a laser beam and shape its mode, to a certain extent. A waveguide resonator is defined by the so-called Fresnel number, $N_F=a^2/(\lambda L)<0.5$, where a is half of the resonator aperture, $\lambda$ the wavelength of the laser beam, and L is the resonator length. One significant advantage of using a waveguide resonator to form a laser beam lies in the fact that it allows a decrease in the transverse dimensions of the laser beam inside the waveguide. Small transverse dimensions increase the diffusive cooling efficiency of a laser gas bounded by the waveguide. A narrow bore also allows efficient transportation of waste heat to the side walls of the resonator. With such efficient cooling, the plasma temperature is lower, increasing gain, and the pressure of the laser gas may be increased. This leads to higher power per gas volume and faster optical response to RF pulses of pump energy.

Area-scaled "slab" waveguide lasers take advantage of efficient cooling in the waveguide axis, while allowing the other axis to behave with "free-space" characteristics. In order to couple power out of the cavity, the resonator may be designed as an "unstable" resonator in the free-space direction. Such a resonator may take the form of a negative or positive branch unstable resonator. For stability reasons, the negative branch is more popular. Light is coupled out by allowing recirculating energy bouncing between the mirrors to "walk off" the edge of one mirror. The out-coupling percentage may be controlled by the ratio of the different curvatures of the front and rear mirrors in the free-space direction. While diffusion cooled slab waveguide gas lasers deliver high output power with relatively small size and low complexity, such lasers traditionally produce laser beams having asymmetrical transverse profiles (e.g., elliptical cross-sectional profiles) that possess uneven and relatively high divergence in one transverse axis compared to the other. In conventional slab waveguide lasers, these undesirable beam properties have commonly been corrected by incorporating beam shaping optics, including at least one cylindrical lens. Additionally, a spatial mode filter has often been used to eliminate satellites on the beam edges in the free-space unstable-resonator direction. These additional optical elements typically increase production costs and decrease output power through absorption.

SUMMARY

The present invention may comprise one or more of the features recited in the attached claims and/or one or more of the following features and combinations thereof.

In one embodiment, a laser may comprise a ceramic body defining a chamber therein containing a laser gas. The ceramic body may include a plurality of parallel walls that partially define a first section of the chamber, the first section of the chamber defining a waveguide. The ceramic body may further include a plurality of oblique walls that partially define a second section of the chamber, the second section of the chamber being shaped to modify a transverse profile of a laser beam traveling through the second section of the chamber. The laser may further comprise a plurality of electrodes positioned outside the ceramic body and adjacent to the plurality of parallel walls such that only laser gas within the first section of the chamber is excited when an excitation signal is applied to the plurality of electrodes.

The laser may further comprise a first mirror located adjacent to a first end of the chamber and a second mirror located adjacent to a second end of the chamber, the second end being opposite the first end. The first and second mirrors may create a resonator in the first section of the chamber. The plurality of electrodes may be positioned such that portions of the laser gas adjacent to the first and second mirrors are not excited when the excitation signal is applied to the plurality of electrodes. A distance between the plurality of oblique walls of the ceramic body may increase between the first end of the chamber and the second end of the chamber.

The first section of the chamber may be adjacent to the second section of the chamber. A distance between the plurality of oblique walls of the ceramic body may be smaller where the laser beam enters the second section of the chamber from the first section of the chamber and may be larger where the laser beam exits the second section of the chamber. The plurality of oblique walls of the ceramic body may be shaped such that the laser beam has an asymmetrical cross-sectional profile when entering the second section of the chamber from the first section of the chamber and the laser beam has a symmetrical profile when exiting the second section of the chamber.

The ceramic body may be comprised of at least one of Aluminum Oxide ($Al_2O_3$), Beryllium Oxide (BeO) and Aluminum Nitride (AlN). Each of the plurality of electrodes may comprise a multiple segment electrode. The laser may further comprise an energy source configured to excite the plurality of electrodes using an RF excitation signal.

In another embodiment, a laser may comprise a chamber containing a laser gas and the chamber may include (i) a resonator section partially bounded by a first plurality of dielectric walls having a constant gap therebetween and (ii) a beam shaping section partially bounded by a second plurality of dielectric walls having a varying gap therebetween. The laser may also comprise a plurality of electrodes positioned outside the chamber and adjacent to the first plurality of dielectric walls such that only laser gas within the resonator section of the chamber is excited when an excitation signal is applied to the plurality of electrodes.

The first plurality of dielectric walls may define a waveguide for a laser beam traveling in the resonator section of the chamber, and the second plurality of dielectric walls may be shaped to modify a transverse profile of a laser beam traveling in the beam shaping section of the chamber. The first and second pluralities of dielectric walls may comprise walls of an airtight ceramic vessel. The laser may further comprise a pair of mirrors located at opposing ends of the resonator section of the chamber. The plurality of electrodes may be positioned such that portions of the laser gas adjacent to each of the pair of mirrors are not excited when the excitation signal is applied to the plurality of electrodes.

The resonator section of the chamber may be adjacent to the beam shaping section of the chamber. The varying gap between the second plurality of dielectric walls partially bounding the beam shaping section of the chamber may increase from a first location where a laser beam enters the beam shaping section of the chamber from the resonator section of the chamber to a second location where the laser beam exits the beam shaping section of the chamber. The second plurality of dielectric walls partially bounding the beam shaping section of the chamber may be shaped such that a laser beam has an asymmetrical cross-sectional profile when entering the beam shaping section of the chamber from the resonator section of the chamber and the laser beam has a substantially symmetrical profile when exiting the beam shaping section of the chamber.

In yet another embodiment, a laser may comprise a waveguide resonator bounded by at least two parallel dielectric walls and at least two mirrors. The laser may also comprise a tapered waveguide bounded by at least two oblique dielectric walls, the tapered waveguide being adjacent to the waveguide resonator. The laser may further comprise at least two electrodes positioned outside the waveguide resonator such that a gain medium is generated only in the waveguide resonator when an excitation signal is applied to the at least two electrodes. The at least two mirrors may form an unstable negative branch resonator. The at least two mirrors may form an unstable positive branch resonator. The at least two electrodes may be positioned such that a gap exists between each of the at least two mirrors and the gain medium that is generated when the excitation signal is applied to the at least two electrodes.

DESCRIPTION OF THE ILLUSTRATIVE EMBODIMENT

For the purposes of promoting an understanding of the principles of the invention, reference will now be made to an illustrative embodiment shown in the attached drawings and specific language will be used to describe the same.

One illustrative embodiment of a laser 10, according to the present disclosure, is shown in the diagrams of FIGS. 1-5. The laser 10 is embodied as a ceramic gas laser having an integrated beam shaping waveguide. The laser 10 generally includes a resonator section 12 and a beam shaping section 14. The resonator section 12 is bounded by parallel walls, having a constant gap therebetween, that function as a waveguide resonator for a laser beam traveling in the resonator section 12. The beam shaping section 14 is bounded by oblique walls, having a varying gap therebetween, that function to reshape a transverse profile of a laser beam traveling in the beam shaping section 14. In the illustrative embodiment, a portion of the laser gas in the resonator section 12 is excited and creates a laser gain medium, but the laser gas in the beam shaping section 14 is not excited. Therefore, the beam shaping section is non-amplifying for the laser beam travelling through it.

Figure 1:
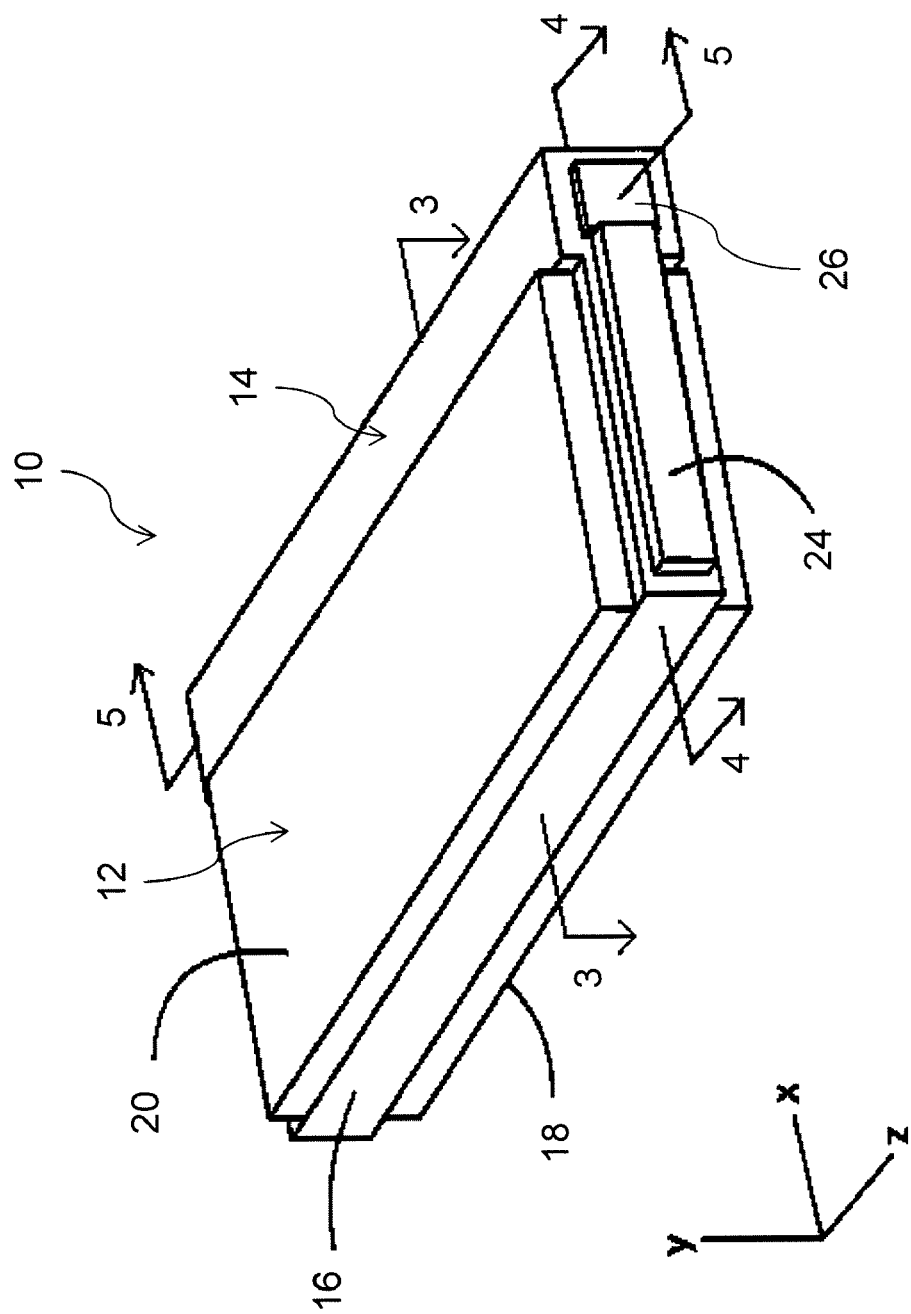
FIG. 1 is an isometric diagram of one illustrative embodiment of a ceramic gas laser having an integrated beam shaping waveguide.
Figure 2:
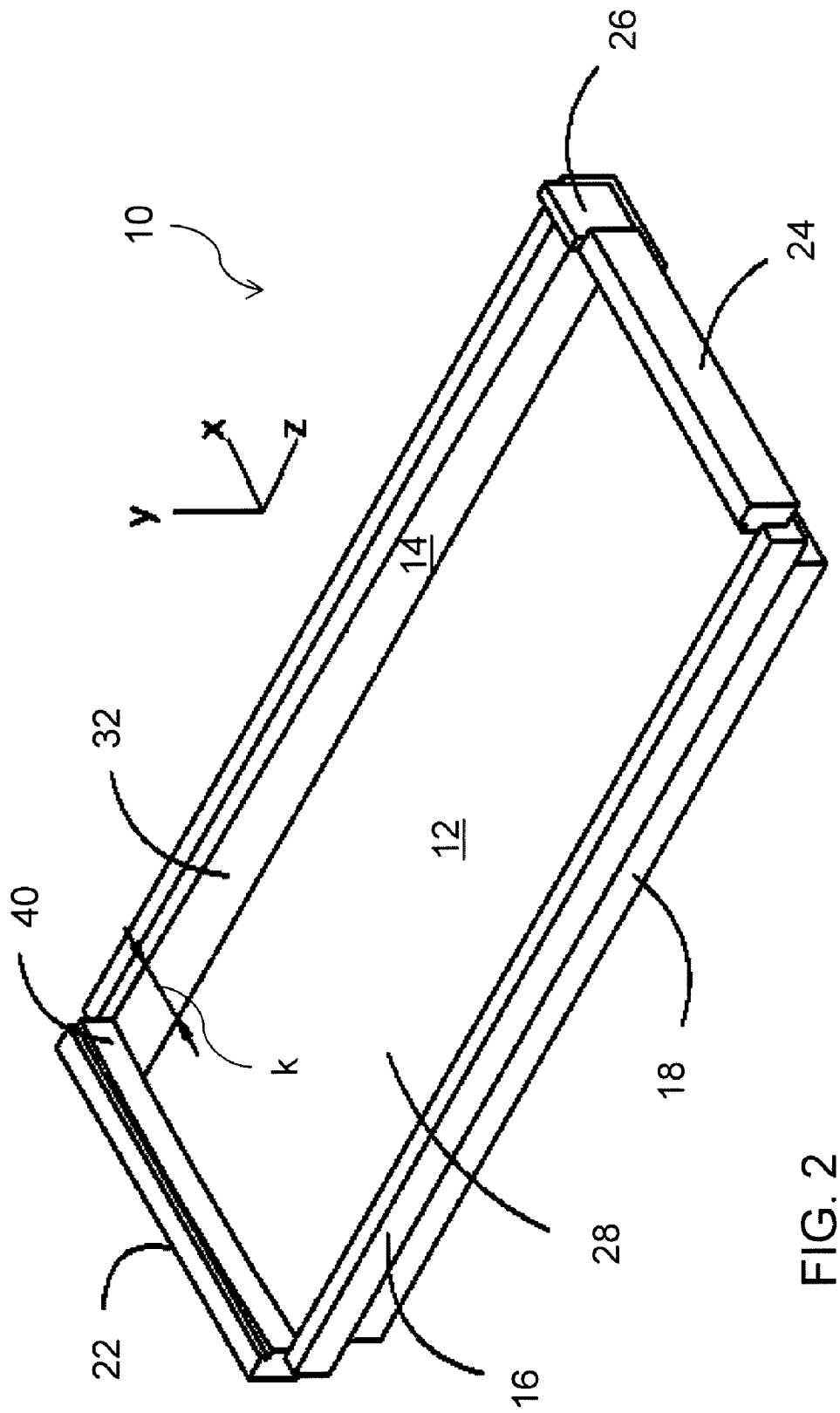
FIG. 2 is an isometric diagram of the ceramic gas laser of FIG. 1 with some components removed to show the internal structure of the laser.

Referring now to FIGS. 1 and 2, the illustrative embodiment of the laser 10 includes a ceramic body 16, a pair of electrodes 18, 20, a pair of mirrors 22, 24, and an exit window 26. The view of the laser 10 in FIG. 2 is similar to that of FIG. 1, except that the electrode 20 and a portion of the ceramic body 16 have been removed in FIG. 2 to render the interior of the laser 10 visible. The same reference numerals are used to identify similar components of the laser 10 throughout FIGS. 1-5.

The ceramic body 16 of the laser 10 is illustratively embodied as a closed, airtight vessel containing a laser gas. In some embodiments, the ceramic body 16 may be formed of Aluminum Oxide ($Al_2O_3$), Beryllium Oxide (BeO), and/or Aluminum Nitride (AlN). It is also contemplated that the ceramic body 16 may be formed of other suitable dielectric materials (including non-ceramics). In the illustrative embodiment, the ceramic body 16 at least partially defines both the resonator section 12 and the beam shaping section 14 of the laser 10. In particular, the ceramic body 16 includes two parallel walls 28, 30 that partially define the resonator section 12 and two oblique walls 32, 34 that partially define the beam shaping section 14. The respective functions of these walls 28-34 (which are generally visible in FIGS. 2, 4, and 5) will described in greater detail below. While the ceramic body 16 is shown as an integral component in the illustrative embodiment, the ceramic body 16 may be comprised of several distinct pieces in other embodiments. In still other embodiments, it is contemplated that the ceramic body 16 may be larger than the resonator and beam shaping sections 12, 14 and may include additional chambers to hold a gas reservoir.

Figure 3:
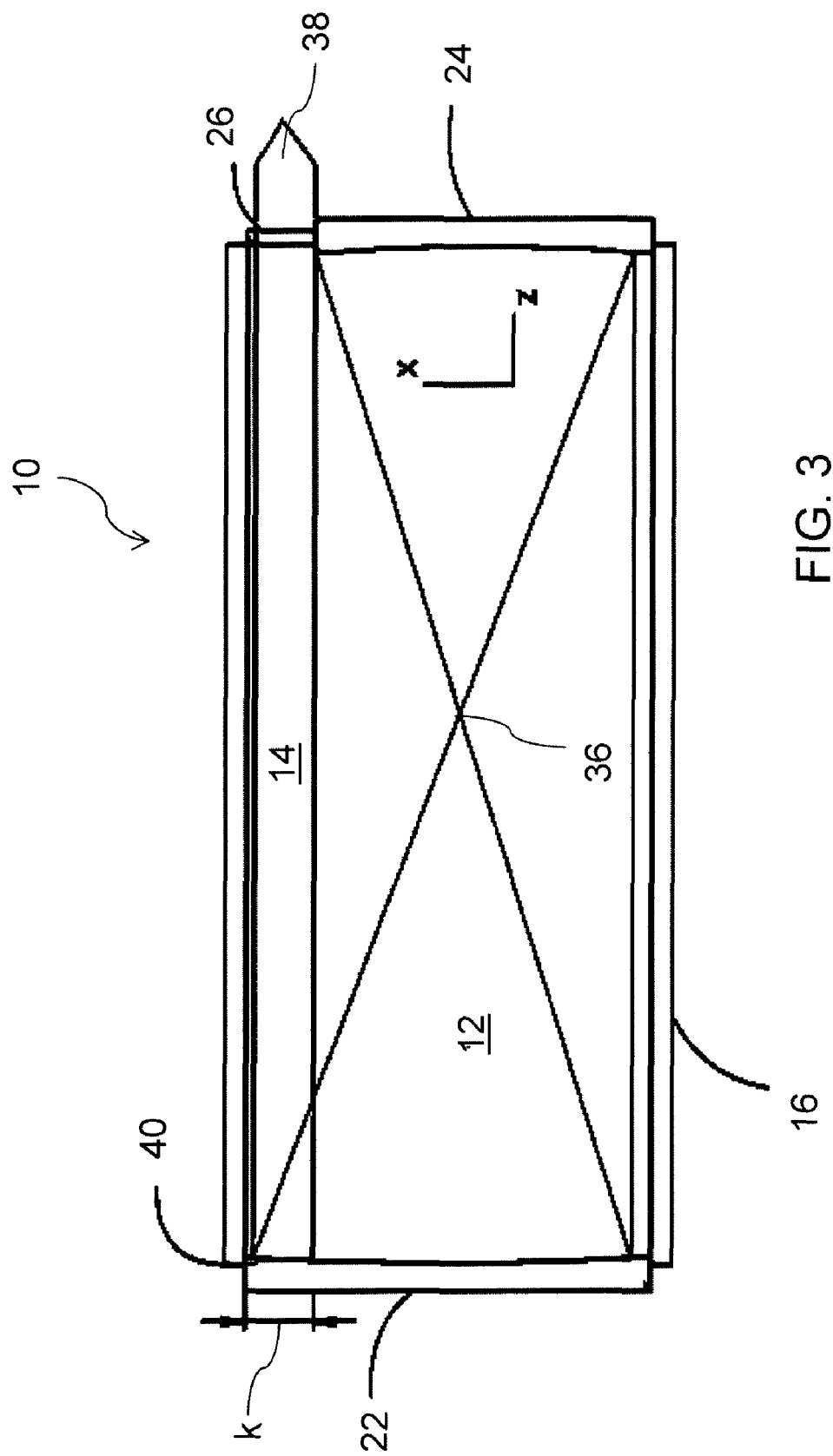
FIG. 3 is a cross-sectional diagram of the ceramic gas laser of FIG. 1 along the line 3-3 (in the x-z plane), including a depiction of a laser beam traveling through both a resonator section and a beam shaping section and leaving the laser through an exit window.
Figure 4:
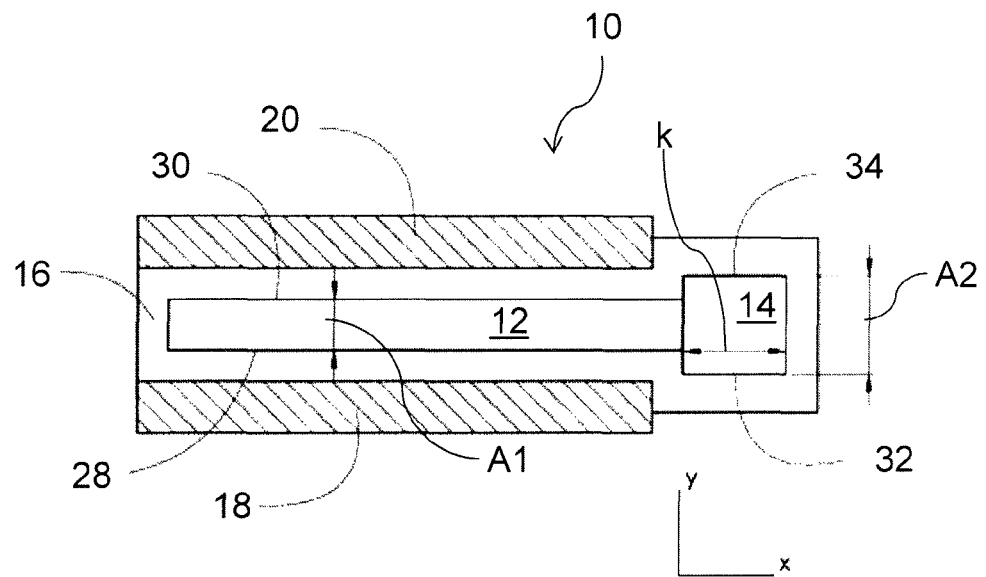
FIG. 4 is a cross-sectional diagram of the ceramic gas laser of FIG. 1 along the line 4-4 (in the x-y plane).
Figure 5:
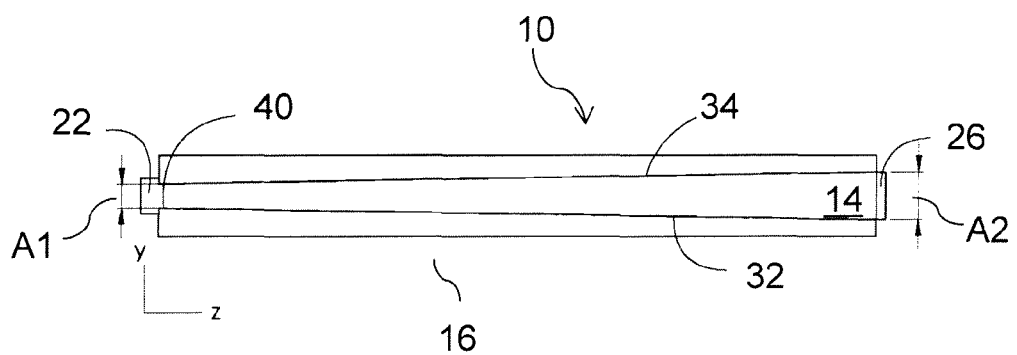
FIG. 5 is a cross-sectional diagram of the ceramic gas laser of FIG. 1 along the line 5-5 (in the y-z plane).

The laser 10 includes a pair of mirrors 22, 24 at opposite ends of the resonator section 12. In the illustrative embodiment, the two mirrors 22, 24 are attached to the ceramic body 16 and are in contact with the laser gas enclosed by the ceramic body 16. The mirrors 22, 24 may be spherical, aspherical, planar, cylindrical, or other shapes, depending on the design of the laser 10. The two mirrors 22, 24 face one another and form a resonator. In the illustrative embodiment, the mirrors 22, 24 form an unstable negative branch resonator with a focal position 36 between the mirrors, as illustrated in FIG. 3. When a portion of the laser gas in the resonator section 12 between the mirrors 22, 24 is excited (as explained further below), the excited laser gas acts as a gain medium for laser radiation. The laser radiation is amplified while bouncing back and forth between the mirrors 22, 24 in the z direction, until a laser beam 38 leaves the laser 10 through an exit, or out-coupling, window 26. In the illustrative embodiment employing a negative branch unstable resonator, the laser beam 38 leaves the exit window 26 substantially parallel to an optical axis z. While the illustrative embodiment is shown as having a transparent exit window 26, other embodiments may employ a mirror 24 which covers the entire end of the laser 10 but has a partially reflective area to allow beam exit.

The laser 10 also includes a pair of electrodes 18, 20 to excite a portion of the laser gas enclosed by the ceramic body 16. Specifically, the electrodes 18, 20 are positioned to excite the portion of laser gas in the resonator section 12 of the laser 10 (but not the portion of laser gas in the beam shaping section 14). The electrodes 18, 20 are connected to an RF voltage source (not shown). An RF excitation, illustratively in the range of 40-150 MHz, is used to excite the laser gas between the electrodes 18, 20, which, through capacitive coupling through the ceramic walls of 16, produces a plasma. In the illustrative embodiment, the two electrodes 18, 20 are located externally to the ceramic body 16, above the parallel walls 28, 30, and opposite one another (see FIG. 4). As such, the pair of electrodes 18, 20 surround only the resonator section 12 of the ceramic body 16. When energized, the electrodes 18, 20, only excite the portion of the laser gas that is located between them, in the resonator section 12.

Each of the electrodes 18, 20 may have different geometrical forms, may be segmented, and may be flat or at an angle to the parallel walls 28, 30 of the ceramic body 16. The use of electrodes 18, 20 that are external to the ceramic body 16 gives rise to many advantages. For instance, in some embodiments, electrodes of different geometrical forms may be used to excite only certain portions of the laser gas in the resonator section 12. In other embodiments, single segments of multiple segment electrodes may be excited individually. Furthermore, the use of external electrodes 18, allows for a continuous waveguide up to the surface of the mirrors 22, 24 without exciting the portion of laser gas directly adjacent to the mirrors 22, 24. It is well known that a gap between the end of the waveguide and the mirrors may introduce losses into the laser; the larger the gap, the higher the losses. On the other hand, a distance must be maintained between the excited plasma and the mirrors to avoid damage to mirror surfaces. Using external electrodes 18, 20 protects the mirrors 22, 24 from the plasma but still allows the ceramic body 16 to guide the laser radiation to the mirrors 22, 24 without any interruption in the waveguide surfaces.

The parallel walls 28, 30 of the ceramic body 16 and the pair of mirrors 22, 24 form a waveguide resonator in the resonator section 12 of the illustrative laser 10 (hence, a "slab" laser). The walls 28, 30 of the ceramic body 16 extend parallel to one another in the x and z directions and are separated in the y direction by a small gap A1, thereby forming a waveguide. In the illustrative embodiment, this gap is in the range of 1.3 mm to 3 mm, although other distances are contemplated for other embodiments. Any laser radiation which is developed in the resonator section 12 will thus be confined in the y direction through the waveguide and evolve into a stable mode. Laser radiation in the x direction will form an unrestrained free-space mode conforming to the mirrors 22, 24. In the illustrative embodiment, this will be an unstable laser mode, which makes the best use of the resonator volume and delivers a near diffraction limited beam. As will be appreciated by those of skill in the art, the end mirrors 22, 24 will have to be configured appropriately to achieve this mode. In the y direction, the mirrors 22, 24 may be nearly flat, as the beams are confined by the waveguide.

As described above, a portion of the laser gas in the resonator section 12 that is located between the electrodes 18, 20 is excited and acts as a gain medium for any laser radiation being bounced back and forth between the two mirrors 22, 24, thereby amplifying the laser radiation. The narrow distance A1 between the waveguide walls 28, 30 in the transverse direction allows for efficient diffusion cooling of the laser gas. The high gain and high saturation that is inherent to a laser gas in these conditions also allows a laser of high power and high efficiency with small geometric dimensions. The laser radiation will continue to be amplified in the resonator section 12 until the beam reaches a location 40 where the beam enters the beam shaping section 14. The resonator section 12 has a certain out-coupling coefficient that is defined by the design of the mirrors 22, 24 and their position toward one another. This coefficient determines the width k of the beam in the x direction at the location 40 at the mirror 22. At the location 40, the laser beam has an asymmetrical, elliptical beam profile and has different divergence angles in the waveguide plane (y) and the free-space plane (x), as described in the Background section.

As noted above, a beam shaping section 14 is integrated into the ceramic body 16 of laser 10. In the beam shaping section 14, the ceramic body 16 includes oblique walls 32, 34 which are at an angle to one another (i.e., the walls 32, 34 are not parallel). In other words, the walls 32, 34 are separated in the y direction by a gap that changes in either the z direction, the x direction, or both. These oblique walls 32, 34 form a tapered waveguide that reshapes the transverse profile of the laser beam. The beam shaping section 14 may be shaped to transform the laser beam that enters with an elliptical beam profile into a laser beam having a circular beam profile, or any other desired beam profile.

In the illustrative embodiment, the beam shaping section 14 begins at location 40 near the rear mirror 22. The waveguide formed in the ceramic body 16 in this section 14 includes a lower wall 32 and an upper wall 34. These waveguide walls 32, 34 have a variable gap distance in the y direction which transitions from a height A1 (at location 40) to a height A2 at the exit window 26, where the beam 38 leaves the laser 10. The width k of the beam shaping section 14 is constant in the illustrative embodiment. In operation, a laser beam arriving from the resonator section 12 is reflected from the mirror 22 and is directed through the beam shaping section 14. While traveling through the tapered waveguide of beam shaping section 14, the beam is broadening at a controlled rate in the y direction as the gap between the walls 32, 34 is widening. In the x direction (i.e., the unstable resonator direction), the beam is staying more parallel, keeping its beam width k. At the exit window 26, the beam will have the same diameter in the x and y directions, if A2=k. Thus, making the distance A2 at the exit the same size as the width k will produce a symmetrical beam profile at the exit window 26. Several of the distances just discussed are illustratively shown in the cross-sections of FIGS. 4 and 5.

It is contemplated that, in other embodiments, the oblique walls 32, 34 of the beam shaping section 14 may, additionally or alternatively, be curved or bent. Furthermore, in some embodiments, only one of the lower or upper walls 32, 34 may be tilted or curved. In other embodiments, portions of the walls 32, 34 of the beam shaping section 14 may be titled or curved, while other portions of the walls 32, 34 may be parallel to one another. The desired beam shape, or profile, at the exit window 26 dictates the shape of the beam shaping section 14. The waveguide may comprise three walls (including a side wall, as shown in the illustrative embodiment) or be open in the x direction. It will also be appreciated that it is possible to form a waveguide in the beam shaping section 14 that is folded several times over the length of the laser 10 to increase its length.

As describe above, only the resonator section 12 is located between the electrodes 18, 20. As such, only laser gas within the resonator section 12 is excited and, therefore, only the resonator section 12 contains a gain medium. The beam shaping section 14 is also filled with a portion of the laser gas but does not show any amplification of the laser radiation. Instead, the "cold" waveguide of section 14 has a completely uniform absorption over its cross-section, which will not distort the laser beam profile. As the plasma discharge only takes place in the resonator section 12, the distance A1 between the electrode 18, 20 is strictly uniform. This fact, together with the ceramic body 16 between the plasma and electrodes 18, 20, provides for an extremely uniform discharge that allows production of a laser beam with both high power and high beam quality.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A laser comprising:
   a ceramic body defining a chamber therein containing a laser gas, the ceramic body including a plurality of parallel walls that partially define a first section of the chamber, the first section of the chamber defining a waveguide, the ceramic body further including a plurality of oblique walls that partially define a second section of the chamber, the second section of the chamber being shaped to modify a transverse profile of a laser beam traveling through the second section of the chamber, and
   a plurality of electrodes positioned outside the ceramic body and adjacent to the plurality of parallel walls such that only laser gas within the first section of the chamber is excited when an excitation signal is applied to the plurality of electrodes.

2. The laser of claim 1 further comprising:
   a first mirror located adjacent to a first end of the chamber, and
   a second mirror located adjacent to a second end of the chamber, the second end being opposite the first end, the first and second mirrors creating a resonator in the first section of the chamber.

3. The laser of claim 2 wherein the plurality of electrodes are positioned such that portions of the laser gas adjacent to the first and second mirrors are not excited when the excitation signal is applied to the plurality of electrodes.

4. The laser of claim 2 wherein a distance between the plurality of oblique walls of the ceramic body increases between the first end of the chamber and the second end of the chamber.

5. The laser of claim 1 wherein the first section of the chamber is adjacent to the second section of the chamber.

6. The laser of claim 5 wherein a distance between the plurality of oblique walls of the ceramic body is smaller where the laser beam enters the second section of the chamber from the first section of the chamber and is larger where the laser beam exits the second section of the chamber.

7. The laser of claim 5 wherein the plurality of oblique walls of the ceramic body are shaped such that the laser beam has an asymmetrical cross-sectional profile when entering the second section of the chamber from the first section of the chamber and the laser beam has a symmetrical profile when exiting the second section of the chamber.

8. The laser of claim 1 wherein the ceramic body is comprised of at least one of Aluminum Oxide ($Al_2O_3$), Beryllium Oxide (BeO) and Aluminum Nitride (AlN).

9. The laser of claim 1 wherein each of the plurality of electrodes comprises a multiple segment electrode.

10. The laser of claim 1 further comprising an energy source configured to excite the plurality of electrodes using an RF excitation signal.

11. A laser comprising:
    a chamber containing a laser gas, the chamber including (i) a resonator section partially bounded by a first plurality of dielectric walls having a constant gap therebetween and (ii) a beam shaping section partially bounded by a second plurality of dielectric walls having a varying gap therebetween, and
    a plurality of electrodes positioned outside the chamber and adjacent to the first plurality of dielectric walls such that only laser gas within the resonator section of the chamber is excited when an excitation signal is applied to the plurality of electrodes.

12. The laser of claim 11 wherein:
    the first plurality of dielectric walls define a waveguide for a laser beam traveling in the resonator section of the chamber, and
    the second plurality of dielectric walls are shaped to modify a transverse profile of a laser beam traveling in the beam shaping section of the chamber.

13. The laser of claim 11 wherein the first and second pluralities of dielectric walls comprise walls of an airtight ceramic vessel.

14. The laser of claim 11 further comprising a pair of mirrors located at opposing ends of the resonator section of the chamber.

15. The laser of claim 14 wherein the plurality of electrodes are positioned such that portions of the laser gas adjacent to each of the pair of mirrors are not excited when the excitation signal is applied to the plurality of electrodes.

16. The laser of claim 11 wherein the resonator section of the chamber is adjacent to the beam shaping section of the chamber.

17. The laser of claim 16 wherein the varying gap between the second plurality of dielectric walls partially bounding the beam shaping section of the chamber increases from a first location where a laser beam enters the beam shaping section of the chamber from the resonator section of the chamber to a second location where the laser beam exits the beam shaping section of the chamber.

18. The laser of claim 16 wherein the second plurality of dielectric walls partially bounding the beam shaping section of the chamber are shaped such that a laser beam has an asymmetrical cross-sectional profile when entering the beam shaping section of the chamber from the resonator section of the chamber and the laser beam has a substantially symmetrical profile when exiting the beam shaping section of the chamber.

19. A laser comprising:
    a waveguide resonator bounded by at least two parallel dielectric walls and at least two mirrors,
    a tapered waveguide bounded by at least two oblique dielectric walls, the tapered waveguide being adjacent to the waveguide resonator, and
    at least two electrodes positioned outside the waveguide resonator such that a gain medium is generated only in the waveguide resonator when an excitation signal is applied to the at least two electrodes.

20. The laser of claim 19 wherein the at least two mirrors form an unstable negative branch resonator.

21. The laser of claim 19 wherein the at least two mirrors form an unstable positive branch resonator.

22. The laser of claim 20 wherein the at least two electrodes are positioned such that a gap exists between each of the at least two mirrors and the gain medium that is generated when the excitation signal is applied to the at least two electrodes.

* * * * *